(12) United States Patent
Falkner et al.

(10) Patent No.: US 12,440,240 B2
(45) Date of Patent: Oct. 14, 2025

(54) MEDICAL DEVICE FOR PREVENTING REFLUX IN THE CERVIX

(71) Applicant: InnoMed One, LLC, Mobile, AL (US)

(72) Inventors: Peter T. Falkner, Mobile, AL (US); Kirby J. Plessala, Mobile, AL (US); John Krumme, Bainbridge Island, WA (US)

(73) Assignee: InnoMed One, LLC, Mobile, AL (US)

( * ) Notice: Subject to any disclaimer, the term of this patent is extended or adjusted under 35 U.S.C. 154(b) by 0 days.

(21) Appl. No.: 18/037,207

(22) PCT Filed: Nov. 17, 2021

(86) PCT No.: PCT/US2021/059609
§ 371 (c)(1),
(2) Date: May 16, 2023

(87) PCT Pub. No.: WO2022/108961
PCT Pub. Date: May 27, 2022

(65) Prior Publication Data
US 2023/0397933 A1    Dec. 14, 2023

Related U.S. Application Data

(60) Provisional application No. 63/114,600, filed on Nov. 17, 2020.

(51) Int. Cl.
*A61B 17/43* (2006.01)
*A61B 17/34* (2006.01)
*A61B 17/42* (2006.01)

(52) U.S. Cl.
CPC .......... *A61B 17/43* (2013.01); *A61B 17/3415* (2013.01); *A61B 17/3439* (2013.01);
(Continued)

(58) Field of Classification Search
CPC ....... A61B 17/42; A61B 17/425; A61B 17/43; A61B 17/435; A61B 17/3415;
(Continued)

(56) References Cited

U.S. PATENT DOCUMENTS

| 406,538 A | 7/1889 | Rickolson |
|---|---|---|
| 2,764,975 A | 10/1956 | Greenberg |

(Continued)

FOREIGN PATENT DOCUMENTS

| CA | 2799606 A1 | 11/2010 |
|---|---|---|
| CN | 201029975 Y | 3/2008 |

(Continued)

*Primary Examiner* — Samuel G Gilbert
(74) *Attorney, Agent, or Firm* — John S. Sears; Lex Generalis, LLC

(57) ABSTRACT

A medical device operable to prevent reflux in the cervix is disclosed. The device includes a shield operable to cover the external os and an arm operable to penetrate the endocervical canal with a bore extending therethrough, wherein the arm includes a sleeve containing a fluid that is operable to conform to the contours of the inner lining of the endocervical canal, thus creating a strong, more efficient fluid-tight seal between the device and the surrounding tissue.

15 Claims, 18 Drawing Sheets

(52) U.S. Cl.
CPC . *A61B 2017/3419* (2013.01); *A61B 2017/345* (2013.01); *A61B 2017/3486* (2013.01); *A61B 2017/4225* (2013.01)

(58) Field of Classification Search
CPC ........ A61B 17/3439; A61B 2017/3419; A61B 2017/345; A61B 2017/3486; A61B 2017/4225
See application file for complete search history.

(56) References Cited

U.S. PATENT DOCUMENTS

| | | | |
|---|---|---|---|
| 3,063,455 | A | 11/1962 | Markley |
| 4,322,463 | A | 3/1982 | Goepp |
| 4,356,817 | A | 11/1982 | McKibben |
| 4,585,438 | A | 4/1986 | Makler |
| 5,037,431 | A | 8/1991 | Summers |
| 5,195,964 | A | 3/1993 | Kletzky et al. |
| 5,209,238 | A | 5/1993 | Sundhar |
| 5,472,419 | A | 12/1995 | Bacich |
| 5,496,272 | A | 3/1996 | Chung |
| 5,536,243 | A * | 7/1996 | Jeyendran .............. A61B 17/43 600/35 |
| 5,810,861 | A | 9/1998 | Gaber |
| 5,916,144 | A | 6/1999 | Li |
| 5,928,249 | A | 7/1999 | Saadat |
| 5,931,843 | A | 8/1999 | Dunaway |
| 5,935,098 | A | 8/1999 | Blaisdell |
| 6,129,214 | A | 10/2000 | Bar-Ami et al. |
| 6,491,645 | B1 | 12/2002 | Gaber |
| 6,511,415 | B1 | 1/2003 | Christine et al. |
| 6,526,980 | B1 | 3/2003 | Tracy |
| 6,610,005 | B1 * | 8/2003 | Tao .................... A61M 25/0111 604/3 |
| 6,773,418 | B1 | 8/2004 | Sharrow |
| 8,257,244 | B2 | 9/2012 | Mock |
| 8,734,364 | B1 | 5/2014 | Mantzaris et al. |
| 8,747,414 | B2 | 6/2014 | Grillo |
| 11,883,073 | B2 | 1/2024 | Plessala et al. |
| 2002/0007222 | A1 * | 1/2002 | Desai ....................... A61F 2/88 623/23.65 |
| 2002/0022870 | A1 | 2/2002 | Truckai et al. |
| 2002/0193658 | A1 | 12/2002 | Simmet |
| 2004/0162461 | A1 | 8/2004 | Christine et al. |
| 2005/0222601 | A1 | 10/2005 | Erhard |
| 2006/0183973 | A1 | 8/2006 | Kamrava |
| 2008/0039864 | A1 | 2/2008 | Feuer |
| 2008/0249364 | A1 | 10/2008 | Korner |
| 2009/0163765 | A1 | 6/2009 | Chen |
| 2011/0152606 | A1 | 6/2011 | Bollinger |
| 2013/0144125 | A1 | 6/2013 | Konstorum |
| 2014/0200591 | A1 * | 7/2014 | Sullivan ................ A61B 17/42 606/119 |
| 2014/0309488 | A1 | 10/2014 | Fowler |
| 2014/0371737 | A1 | 12/2014 | Korvick et al. |
| 2015/0133779 | A1 | 5/2015 | Yurek et al. |
| 2015/0147345 | A1 | 5/2015 | Kwiatkowski |
| 2017/0367728 | A1 | 12/2017 | Qu et al. |
| 2018/0084971 | A1 | 3/2018 | Truckai |
| 2018/0271581 | A1 | 9/2018 | Ouyang et al. |
| 2019/0274756 | A1 | 9/2019 | Chee et al. |
| 2019/0282271 | A1 * | 9/2019 | Plessala ................ A61M 25/01 |
| 2020/0179006 | A1 | 6/2020 | Plessala et al. |
| 2020/0289160 | A1 | 9/2020 | Plessala et al. |
| 2021/0386456 | A1 | 12/2021 | Plessala et al. |
| 2023/0031283 | A1 | 2/2023 | Hsu et al. |

FOREIGN PATENT DOCUMENTS

| | | |
|---|---|---|
| CN | 101028212 B | 5/2010 |
| CN | 102438532 A | 5/2012 |
| CN | 203029423 U | 7/2013 |
| CN | 113164190 A | 7/2021 |
| EP | 0890342 A1 | 1/1999 |
| EP | 1089663 A1 | 4/2001 |
| EP | 1250897 A1 | 10/2002 |
| JP | S61-113437 A | 5/1986 |
| JP | 1995213619 A | 8/1995 |
| JP | 1995275256 A | 10/1995 |
| JP | 1997108235 A | 4/1997 |
| JP | 2002-513608 A | 5/2002 |
| JP | 2007522864 A | 8/2007 |
| JP | 2016-538858 A | 12/2016 |
| JP | 2017-537971 A | 12/2017 |
| WO | 1996018350 A1 | 6/1996 |
| WO | 1997022309 A1 | 6/1997 |
| WO | 1999056628 A1 | 11/1999 |
| WO | 01/74417 A2 | 10/2001 |
| WO | 2001074417 A2 | 10/2001 |
| WO | 2010135349 A2 | 11/2010 |
| WO | 2012060932 A2 | 5/2012 |
| WO | 2014111943 A2 | 7/2014 |
| WO | 2014121333 A1 | 8/2014 |
| WO | 2015/189442 | 12/2015 |
| WO | 2018/101934 A1 | 6/2018 |
| WO | 2018/102590 A1 | 6/2018 |
| WO | 2019108818 A1 | 6/2019 |
| WO | 2019/209775 A2 | 10/2019 |
| WO | 2020/033625 | 2/2020 |
| WO | 2020077122 A1 | 4/2020 |

* cited by examiner

Section A - A

Section B-B

Section C-C ific*ally, the present invention relates to a

MEDICAL DEVICE FOR PREVENTING REFLUX IN THE CERVIX

RELATED APPLICATIONS

This application claims priority to U.S. Provisional Patent Application No. 63/114,600, filed Nov. 17, 2020. The entire contents of the above application are hereby incorporated by reference as though fully set forth herein.

FIELD

The present invention relates in general to medical devices. More specifically, the present invention relates to a device used to prevent reflux in the cervix during an insemination procedure.

BACKGROUND

Artificial insemination aims to place sperm into the reproductive system of a patient to promote pregnancy. Typically, artificial insemination is carried out when it is difficult or impossible for sperm to enter a patient's reproductive system during sexual intercourse. Intracervical insemination, where a semen sample is inserted into a patient's cervical canal, and intrauterine insemination, where a semen sample is inserted into a patient's uterine cavity, are the two most common artificial insemination procedures currently used. Generally, during such procedures, a patient's vaginal walls are held open by a medical device, such as a speculum. A semen sample is then inserted into the patient's cervical canal or uterine cavity, depending on which procedure is being performed, typically via a catheter-syringe assembly. After insertion, the semen is left to take by the patient's reproductive system.

However, a portion of the semen sample is often lost by leaking from the cervical canal into the vaginal cavity of the patient due to reflux caused by uterine contractions. Accordingly, unless a barrier is established between the patient's cervical canal and vaginal cavity after the semen sample is inserted, the efficacy of the insemination procedure may be diminished due to such reflux.

In order to prevent such reflux, a shielding device is often deployed in order to serve as a cervical plug after insemination. Such shielding devices are known in the art and vary in size and shape, but the general configuration consist of some form of wall or barrier, with a bore usually in the center of the barrier. The catheter is then fed through bore of the shielding device and inserted into the cervical canal or uterine cavity where a semen sample is directed through the catheter and deposited. After insemination, the shielding device serves as a barrier between the cervical canal and the vaginal canal. The catheter is then removed as any foreign object in the cervical canal or uterine cavity can trigger a biological response that may diminish the possibility of an egg being fertilized.

Because every patient has a different anatomy, and cervical plugs in the art are mass produced to have a standard configuration, a proper seal often is not achieved. Accordingly, there is a need for a cervical plug that is configured to conform to the individualized contours of the inner lining of the endocervical canal that is unique to each patient.

BRIEF SUMMARY OF INVENTION

The present invention seeks to meet these needs by providing a medical device operable to prevent reflux in the cervix, the device comprising a shield operable to cover the external os and an arm operable to penetrate the endocervical canal with a bore extending therethrough, wherein the arm includes a sleeve containing a fluid that is operable to conform to the contours of the inner lining of the endocervical canal, thus creating a strong, more efficient fluid-tight seal between the device and the surrounding tissue.

An alternative embodiment of the sleeve includes one or more tubes embedded in the sleeve. Each of the tubes are operable to hold a fluid and configured to conform to the lining of the endocervical canal.

In yet another embodiment, the sleeve comprises a single hollow-tube configured to wrap around the arm. The tube is operable to hold a fluid and configured to conform to the lining of the endocervical canal.

In yet another embodiment, the sleeve comprises a plurality of circumferential protrusions operable to engage the lining of the endocervical canal.

For any of the aforementioned embodiments, the sleeve may be removable or form an integral part of the arm. Additionally, any of the embodiments may include a valve disposed at either end of the device that is operable to create a fluid tight seal when in the closed position. As an additional option, any of the embodiments may include a insert member secured to the proximal side of the shield to aid in the removal of the device.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
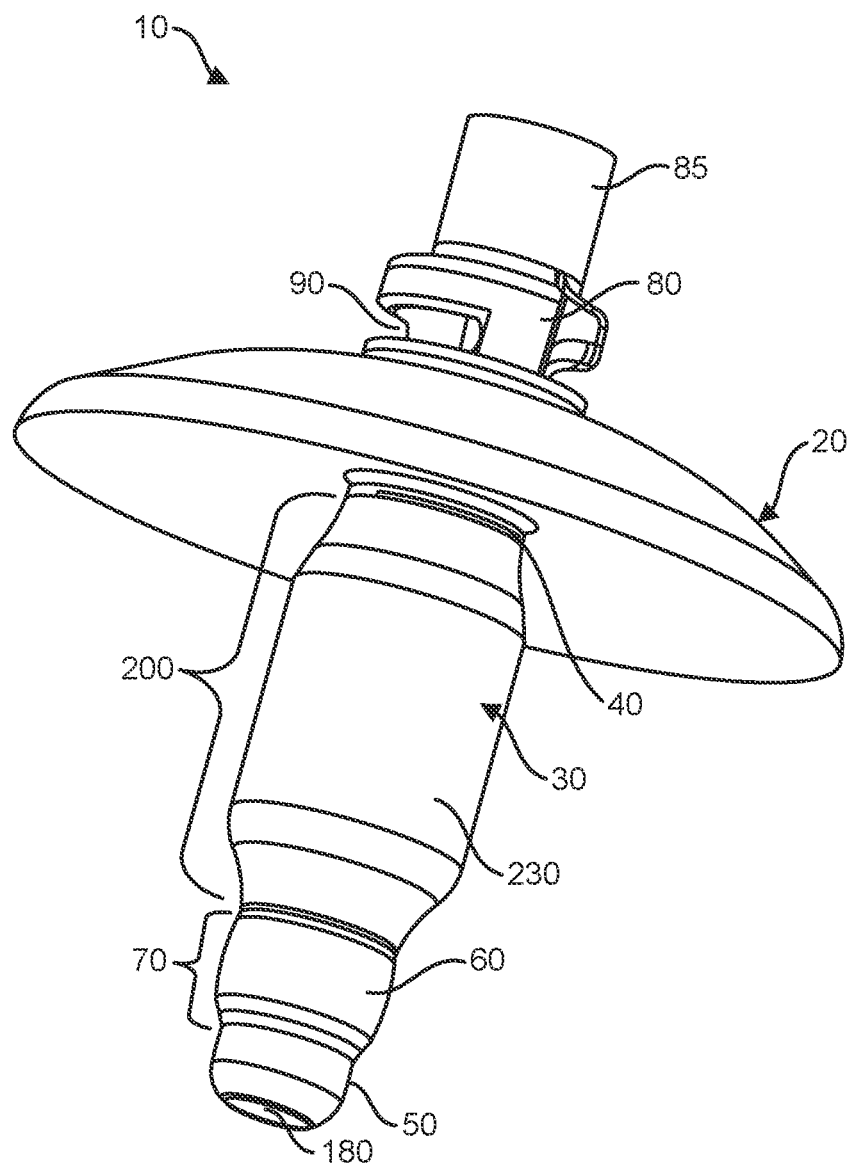
FIG. 1 is a side perspective view of the medical device in accordance with the embodiments of the invention.
Figure 2:
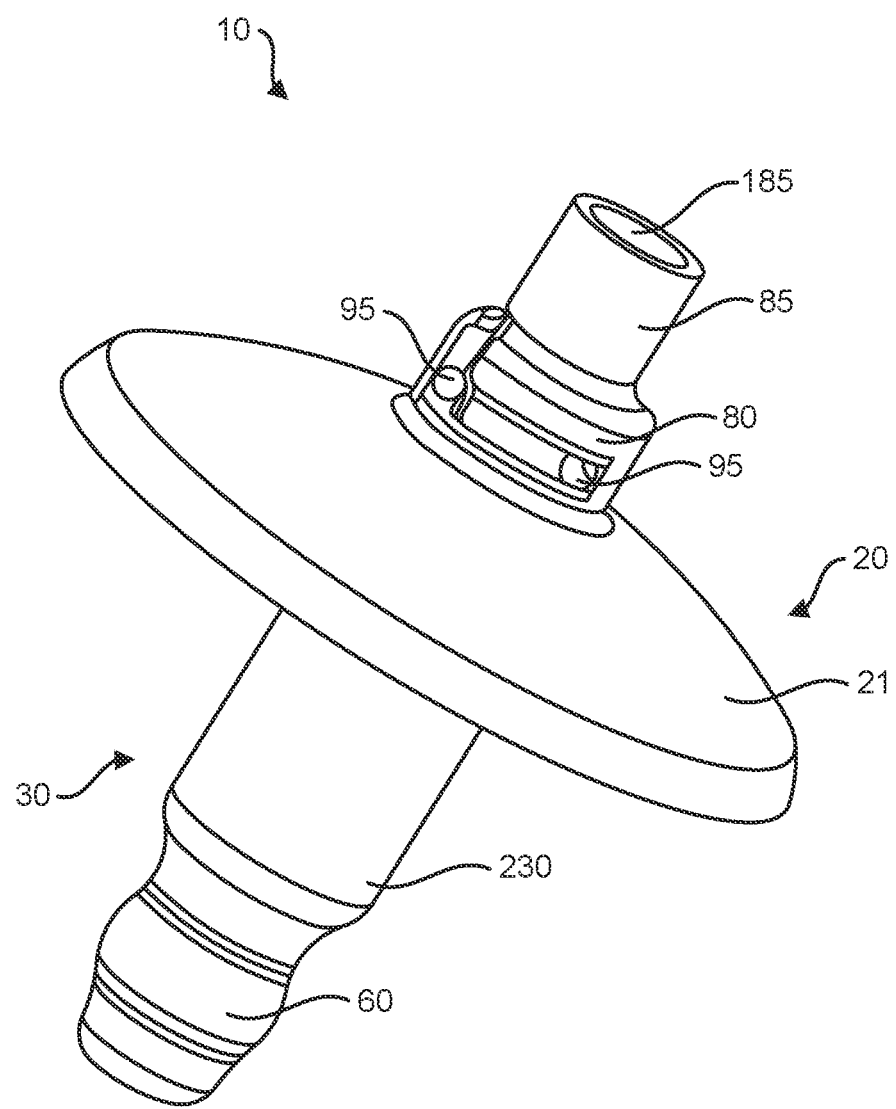
FIG. 2 is an alternative side perspective view of the medical device in accordance with the embodiments of the invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

For a further understanding of the nature and function of the embodiments, reference should be made to the following detailed description.

Turning to FIGS. 1-6, a medical device 10 for preventing reflux in the cervix is shown. The medical device 10 includes a shield 20 with a proximal surface 21 and opposing distal surface 22, and an arm 30 secured to the distal surface 22 of the shield 20. For purposes of this application, "proximal" and "distal" are in reference to proximity to a physician when using the device. The distal surface 22 of the shield 20 is configured to cover an orifice, including the external os 120 of the cervix, and the arm 30 is configured to be inserted into the orifice.

Figure 14:
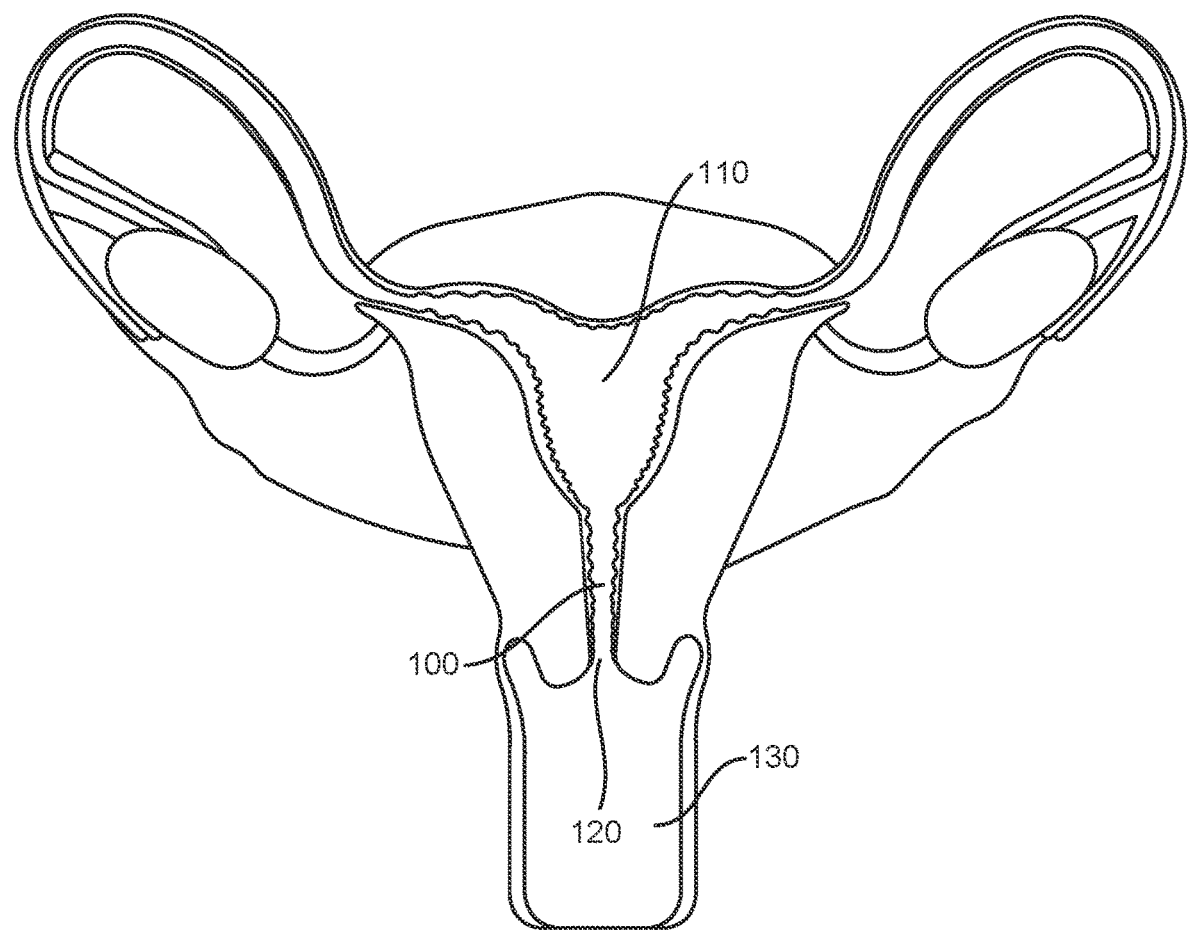
FIG. 14 is an internal view of the female reproductive system.
Figure 15:
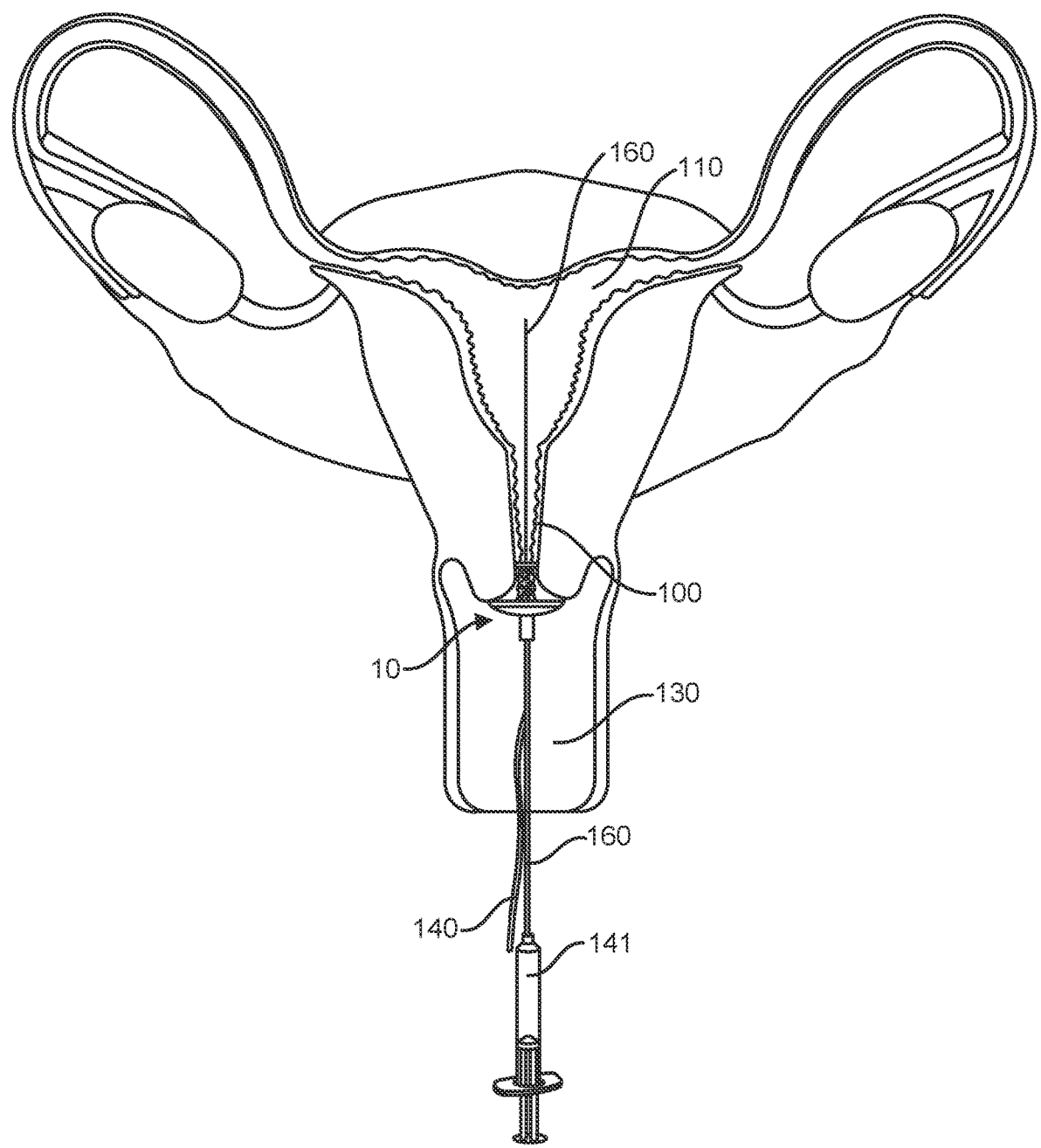
FIG. 15 is an internal view of the female reproductive system showing the medical device in accordance with the embodiments of the invention being inserted into the endocervical canal.

As shown in FIGS. 14-15, during artificial insemination, the medical device 10 is inserted through the vaginal cavity 130 and into the cervical canal 100 of a patient such that the arm 30 is inserted into the patient's cervical canal 100 and the shield 20 covers the patient's external os 120. The medical device 10 establishes a physical barrier between a patient's cervical canal 100 and vaginal cavity 130. In this manner, the medical device 10 functions as a plug and prevents leakage of a semen sample back through the cervical canal 100 into the vaginal cavity 130 after the semen sample has been introduced into the cervical canal 100 or uterine cavity 110 of a patient.

To accommodate the contours of the portion of the cervix surrounding a patient's external os 120, the distal surface 22 of the shield 20 that faces the external os 120 may be concave. The shield 20 may be shaped such that the concave distal surface 22 of the shield 20 fits flush against the external os 120 and cervical tissue surrounding the external os 120 of the patient. The curvature of the shield 20 may be adjusted for different patients.

The arm 30 may be secured to the distal surface 22 of the shield 20. In addition, the shield 20 may have a generally circular shape, and the arm 30 may be secured to the shield 20 generally at the center of the shield 20. Alternatively, the shield 20 may be of another shape suitable for covering the external os 120 of a patient, such as an elliptical shape.

The shield 20 may be shaped and sized such that the shield 20 can cover the external os 120 of nulliparous, primiparous, or multiparous women. To minimize pain or discomfort experienced by a patient as the medical device 10 is inserted or removed from the patient's body, the shield 20 may be made of a material that is somewhat flexible such that the material may be deformed by pressure applied by a user of the device but return to its original shape when the pressure is removed. Alternatively, the shield 20 may be made of a material that is substantially rigid or semi-rigid. In addition, the shield 20 may be made of a material that is at least partially translucent or transparent, which may aid a user in inserting the device in the cervical canal.

Alternatively, the shield 20 may be made of an opaque material. The shield 20 is preferably made from medical-grade silicone rubber or its equivalent; however, the shield 20 may be made of any suitable material including, but not limited to, plastic, glass, ceramic, metal, any type of rubber, or any combination thereof.

As shown in FIG. 15, the arm 30 of the medical device 10 is configured to be inserted through the cervical external os 120, or other orifice covered by the shield 20, and into the cervical canal 100 when the medical device 10 is in use. Turning to FIGS. 1-9, the arm 30 is an elongated member having a proximal end 40 and a distal end 50. The proximal end 40 is secured to the distal surface 22 of the shield 20, and the distal end 50 is inserted into the cervical external os 120 when the device is in use. The arm 30 may be permanently secured to the shield 20. For instance, the arm 30 and shield 20 may be molded as a unitary piece of material. Alternatively, the arm 30 may be secured to the shield 20 with an adhesive. To facilitate ease of entry and exit of the arm 30 into and out of a patient's cervical canal 100, the arm 30 may have a generally cylindrical shape.

The arm 30 is sufficiently rigid for inserting the arm 30 into the cervical canal 100 of a patient, but the arm 30 may have some amount of flexibility in order to minimize pain or discomfort experienced by the patient as the device 10 is inserted or removed. Alternatively, the arm 30 may be made of a material that is substantially rigid. In addition, the arm 30 may be made of a material that is at least partially translucent or transparent. Alternatively, the arm 30 may be made of an opaque material. The arm 30 is preferably made from medical-grade silicone rubber. However, the arm may be made of any suitable material including, but not limited to, plastic, glass, ceramic, metal, any type of rubber, or any combination thereof.

The shield 20 and the arm 30 may be configured to secure the medical device 10 in place during use, as shown in FIG. 15, such that the shield 20 remains in place covering an orifice, including the external cervical os 120, until the medical device 10 is removed by a user. As used herein, the terms "during use" or "in use" refer to any point when the arm 30 of the medical device 10 is inserted into an orifice and the shield 20 of the medical device 10 is covering the orifice. FIG. 15 illustrates the device 10 being used with a syringe 141 and catheter 160 for introducing semen into the reproductive system. Following the deposit of the semen sample, the syringe 141 and catheter 160 are removed, and the device 10 remains in position at the external os 120 for a period of time to prevent leakage of semen back into the vaginal cavity 130.

The proximal end 40 of the arm 30 may have a diameter of sufficient size such that when the proximal end 40 of the arm 30 is positioned in the cervical canal 100 of a patient after insertion of the device, a substantially fluid-tight seal is formed between the cervical canal 100 and the vaginal cavity 130 of the patient. The fluid-tight seal formed by insertion of the arm 30 into the cervical canal 100 may facilitate a slight suction between the concave shield 20 and the area of the cervix covered by the shield 20, thereby further securing the medical device 10 in place. When secured in place, the shield 20 may substantially cover the external os 120 and fit flush against the tissue surrounding the external os 120 such that the shield 20, in conjunction with the arm 30, prevent leakage of a sperm sample around the device 10 and into the vaginal cavity 130.

Figure 5:
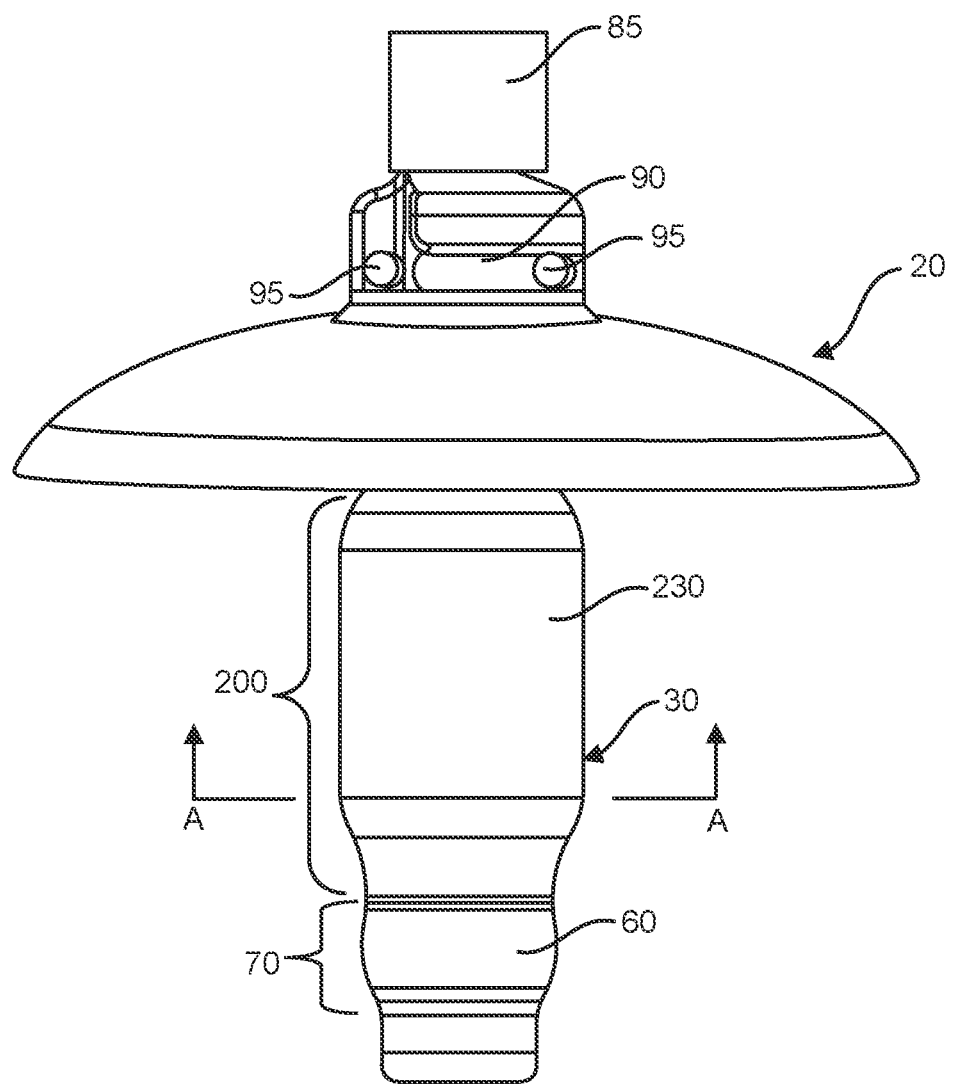
FIG. 5 is a side view of the medical device in accordance with the embodiments of the invention.

The arm 30 may have a protrusion 60, e.g. a circumferential protrusion, at its distal end 50 to help keep the device 10 in place when the arm 30 is inserted into the cervical canal 100 during use. The protrusion 60 is preferably positioned along a length 70 of the arm 30 between a midway point of the arm (midway between the proximal end 40 and the distal end 50) and may preferably be positioned nearer to the distal end 50 of the arm 30 than to the midway point of the arm 30, as shown in FIGS. 1 and 5. The protrusion 60 may come in a variety of shapes and sizes, provided that the protrusion 60 is operable to engage the lining of the cervical canal 100 and provide resistance to movement while the device 10 is in position and in use.

As shown in FIGS. 1-13, the medical device 10 includes a sleeve 205 that extends along a length 200 of the arm 30 between the protrusion 60 and the proximal end 40 of the arm. In other embodiments that may not include the protrusion 60, the length 200 of the sleeve 205 may extend to the distal end 50 of the arm.

Figure 13:
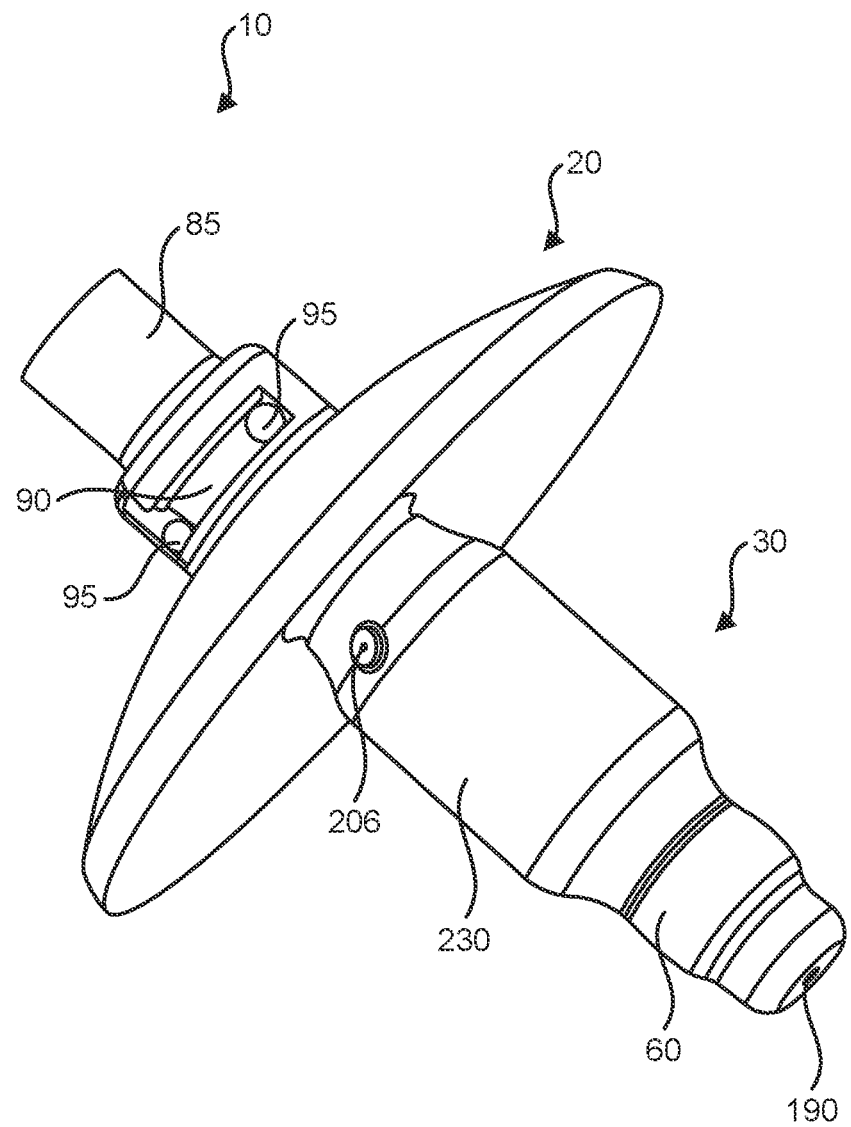
FIG. 13 is a perspective view of the medical device in accordance with the embodiments of the invention showing the sleeve with an injection port.

Turning to FIGS. 7-12, the sleeve 205 is formed by an interior wall 225 and opposing exterior wall 230 that define an enclosed space 235. The enclosed space 235 is operable to hold a fluid 210, which may include a liquid or gaseous substance, including, for example, medical grade silicone or saline. The sleeve 205 may be pre-filled with the fluid 210, or optionally, the sleeve 205 may contain an injection port 206 (as shown in FIG. 13) that allows fluid 210 to be injected and removed from the sleeve 205. Exemplary ports 206 include self-healing and self-sealing ports that would prevent any leakage after injection.

The sleeve 205 may be an integral component of the arm 30 such that the sleeve 205 and arm 30 form a unitary body where the interior wall 225 of the sleeve 205 and the exterior surface 220 of the arm 30 are the same. Alternatively, the sleeve 205 may be a removable component, as detailed in FIG. 9. For the embodiments where the sleeve 205 is removable, the materials used for the sleeve 205 are of sufficient elasticity to allow the sleeve to slidably engage the exterior surface 220 of the arm 30. Moreover, the interior wall 225 of the sleeve 205 is configured to create sufficient friction between the sleeve 205 and the exterior surface 220 of the arm 30 that the sleeve 205 will not move along the arm 30 while in use. For example, the interior wall 225 of the sleeve 205 may be secured to the exterior surface 220 of the arm 30 with an adhesive.

While in use, the exterior wall 230 is configured to conform to the undulations of the cervix. The exterior wall 230 has a minimum thickness operable to house the fluid 210 and is preferably formed using a tissue-compliant material that has non-irritant properties including, for example, medical grade silicone or other suitable polymers and elastomers. During use, the fluid 210 within the sleeve 205 is allowed to freely flow along the length 200 of the arm 30 within the enclosed space 235 of the sleeve 205, and the fluid 210 and exterior wall 230 of the sleeve 205 are operable to conform to the contours of the inner lining of the cervical canal 100. As shown in FIG. 14, the cervical canal 100 is lined with a plurality of undulations that vary in size and shape, and each patient's endocervical canal 100 is unique. The disclosed medical device is operable to adapt and conform to each patient's anatomy. By allowing the fluid 210 to conform to the lining of the cervical canal 100, as shown in FIG. 15, a stronger, more efficient fluid-tight seal between the arm 30 and the surrounding tissue of the cervical canal is made, thus further improving the retention and sealing capabilities of the medical device 10.

Figure 16:
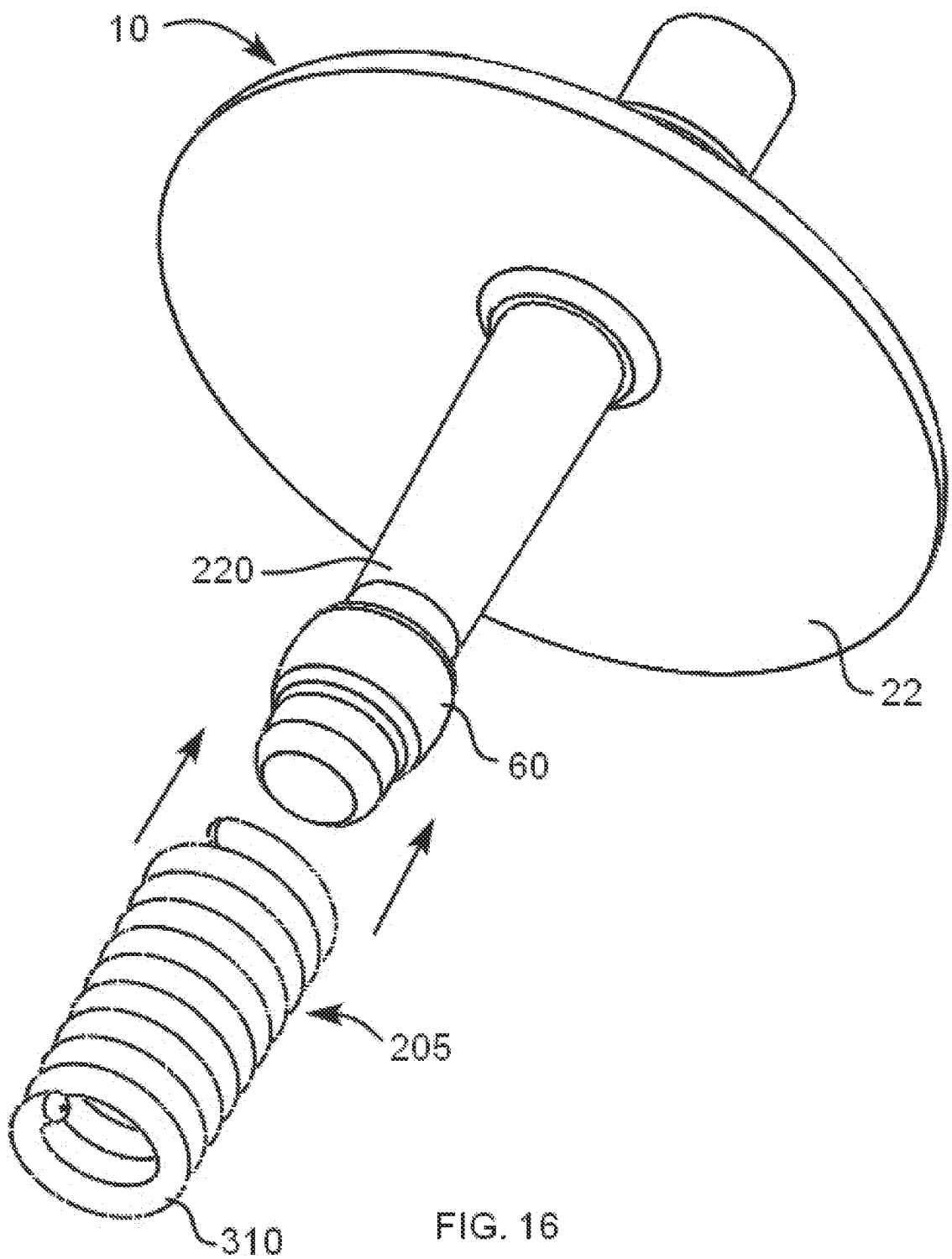
FIG. 16 is an exploded perspective view of the medical device in accordance with the embodiments of the invention showing the sleeve in a removable configuration.
Figure 17:
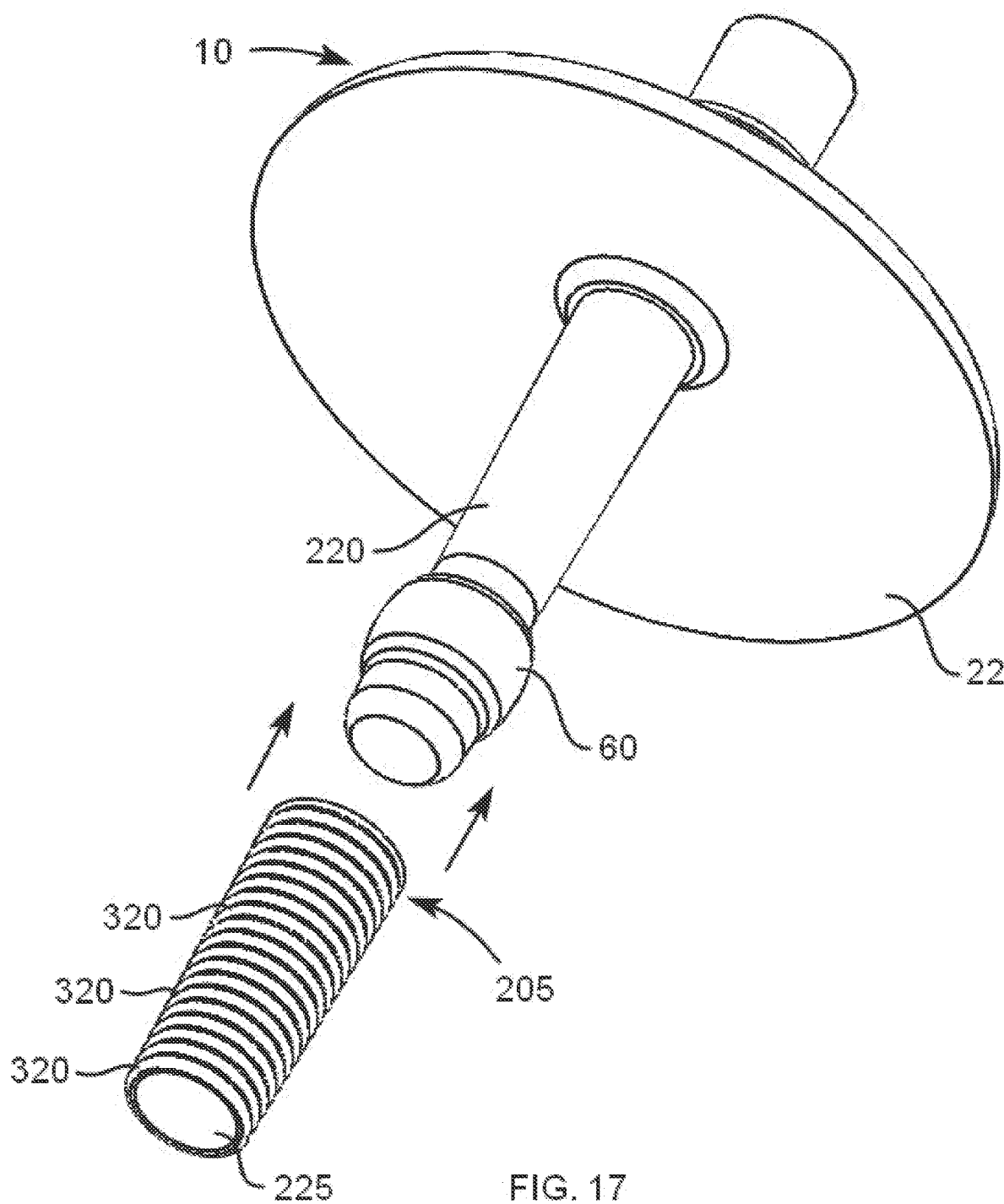
FIG. 17 is an exploded perspective view of the medical device in accordance with the embodiments of the invention showing the sleeve in a removable configuration.
Figure 18:
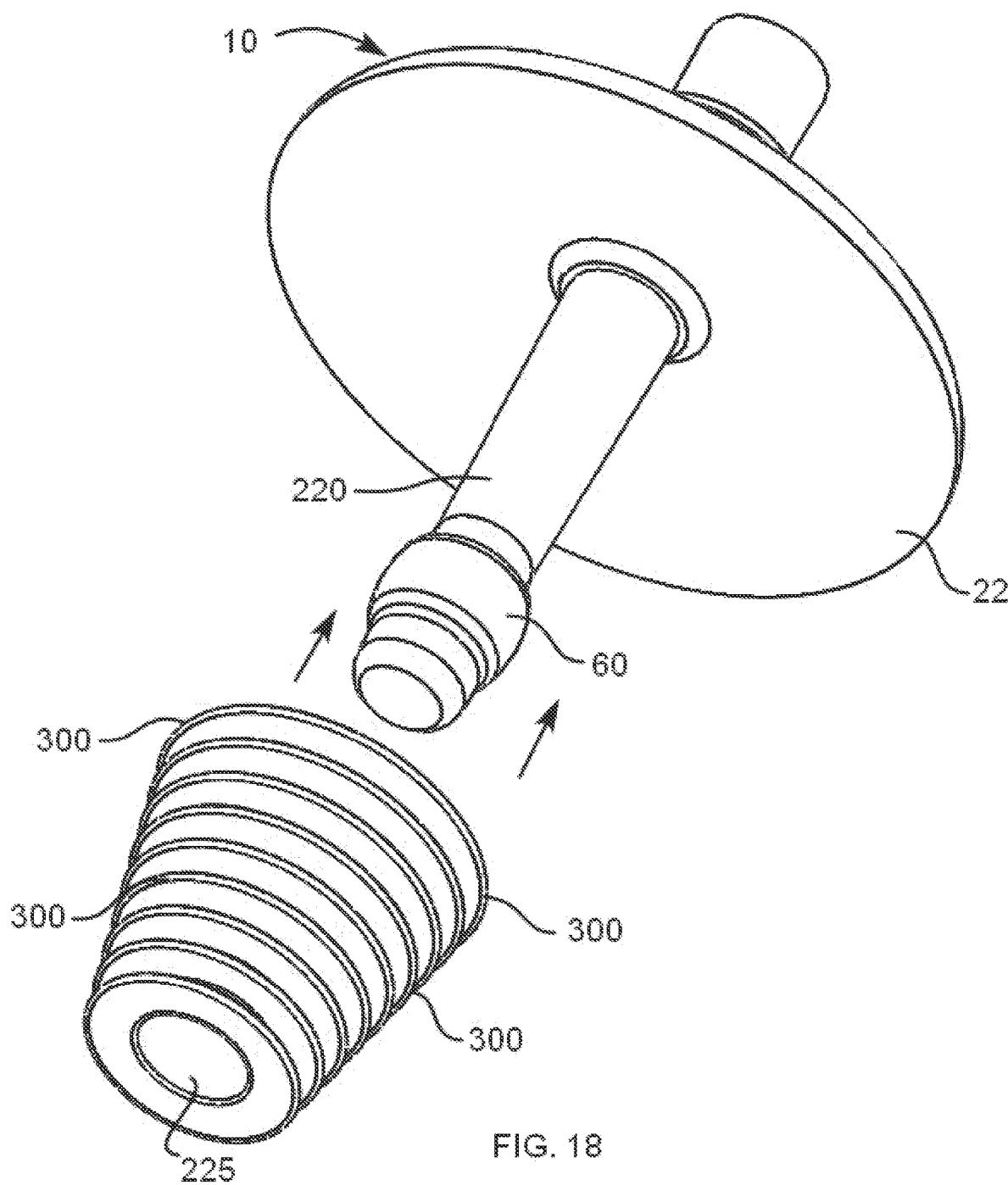
FIG. 18 is an exploded perspective view of the medical device in accordance with the embodiments of the invention showing the sleeve in a removable configuration.

Alternative embodiments of the sleeve 205 are shown in FIGS. 16-18. Turning to FIG. 16, a tubular sleeve 205 is shown comprising a single tube 310 that is hollow and operable to wrap around the arm 30 of the medical device 10. The tube 310 is configured to hold the fluid 205 previously described and may include an injection port 206 to allow the injection and removal of the fluid 205 from the tube 310. The tube 310 is preferably made from a tissue compliant medical grade polymer with non-irritant properties. The sleeve 205 and tube 310 are operable such that the fluid 205 within the tube 310 conforms to the undulations within the cervical canal 100. The tube 310 has sufficient elasticity to allow the tubular sleeve 205 to slidably engage the exterior surface 220 of the arm 30. Moreover, the tube 310 is configured to create sufficient friction between the tube 310 and the exterior surface 220 of the arm 30 that the tube 310 will not move along the arm 30 while in use. For example, the tube 310 may be secured to the exterior surface 220 of the arm 30 with an adhesive.

Turning to FIG. 17, a sleeve 205 comprising one or more embedded tubes 320 operable to hold a fluid 205 is shown. Each tube 320 may be pre-filled with the fluid 205 or include an injection port 206 to allow the injection and removal of the fluid 205 from the tubes 320. Preferably, the sleeve 205 and tubes 320 are formed from a single mold of a tissue compliant medical grade polymer with non-irritant properties. The sleeve 205 and tubes 310 are operable such that the fluid 205 within the tubes 310 conform to the undulations within the cervical canal 100. The materials used for the sleeve 205 are of sufficient elasticity to allow the sleeve 205 to slidably engage the exterior surface 220 of the arm 30. Moreover, the interior wall 225 of the sleeve 205 is configured to create sufficient friction between the sleeve 205 and the exterior surface 220 of the arm 30 that the sleeve 205 will not move along the arm 30 while in use. For example, the interior wall 225 of the sleeve 205 may be secured to the exterior surface 220 of the arm 30 with an adhesive.

As shown in FIG. 18, the sleeve 205 may include a plurality of circumferential ridges 300 disposed along the perimeter of the sleeve. Although not shown in the figures, these ridges 300 may be in the form of other shapes and sizes so long as the circumferential ridges 300, or other protrusions, are operable to engage the lining of the cervical canal 100. Preferably, the sleeve 205 and circumferential ridges 300 are formed from a single mold of a tissue compliant medical grade polymer with non-irritant properties. The circumferential ridges 300 are preferably flexible enough to bend towards the proximal end 40 and distal end 50 of the arm 30 during insertion and removal of the medical device 10 so as to minimize irritation. The materials used for the sleeve 205 are of sufficient elasticity to allow the sleeve 205 to slidably engage the exterior surface 220 of the arm 30. Moreover, the interior wall 225 of the sleeve 205 is configured to create sufficient friction between the sleeve 205 and the exterior surface 220 of the arm 30 that the sleeve 205 will not move along the arm 30 while in use. For example, the interior wall 225 of the sleeve 205 may be secured to the exterior surface 220 of the arm 30 with an adhesive.

Once the arm 30 is inserted into the cervical canal 100, the wider diameter of the protrusion 60, and the conforming of the fluid 210 and sleeve 205 to the undulations along the cervical canal 100, allows for improved retention within the cervical canal 100, thus preventing leakage of deposited semen back out of the cervical canal 100 into the vaginal cavity 130.

As illustrated in FIGS. 1-6, the medical device 10 may further comprise an insert member 80 secured to the shield 20. The insert member 80 may function as an aid for inserting the medical device 10 into the cervical canal 100 and removing the device from the cervical canal 100. The insert member 80 is secured to the opposite side of the shield 20 as the proximal end 40 of the arm 30. The insert member 80 may be permanently secured to the shield 20. For instance, the medical device 10 may be molded as a unitary piece of material including the shield 20, arm 30, and insert member 80. Alternatively, the insert member 80 may be secured to the shield 20 with an adhesive. The insert member 80 may be secured to the shield 20 such that the insert member 80 forms a generally straight line with the arm 30.

The insert member 80 provides a protrusion 85 that may be grabbed using forceps for the purpose of guiding the device during insertion or removing the medical device 10. The insert member 80 may be sufficiently rigid to retain its shape such that it can be grabbed using forceps or a similar device. Alternatively, the insert member 80 may be somewhat flexible. In addition, the insert member 80 may be made of a material that is at least partially translucent or transparent. Alternatively, the insert member 80 may be made of an opaque material. The insert member 80 may comprise medical-grade silicone rubber. However, the insert member may be made of any suitable material including, but not limited to, plastic, glass, ceramic, metal, any type of rubber, or any combination thereof.

Figure 6:
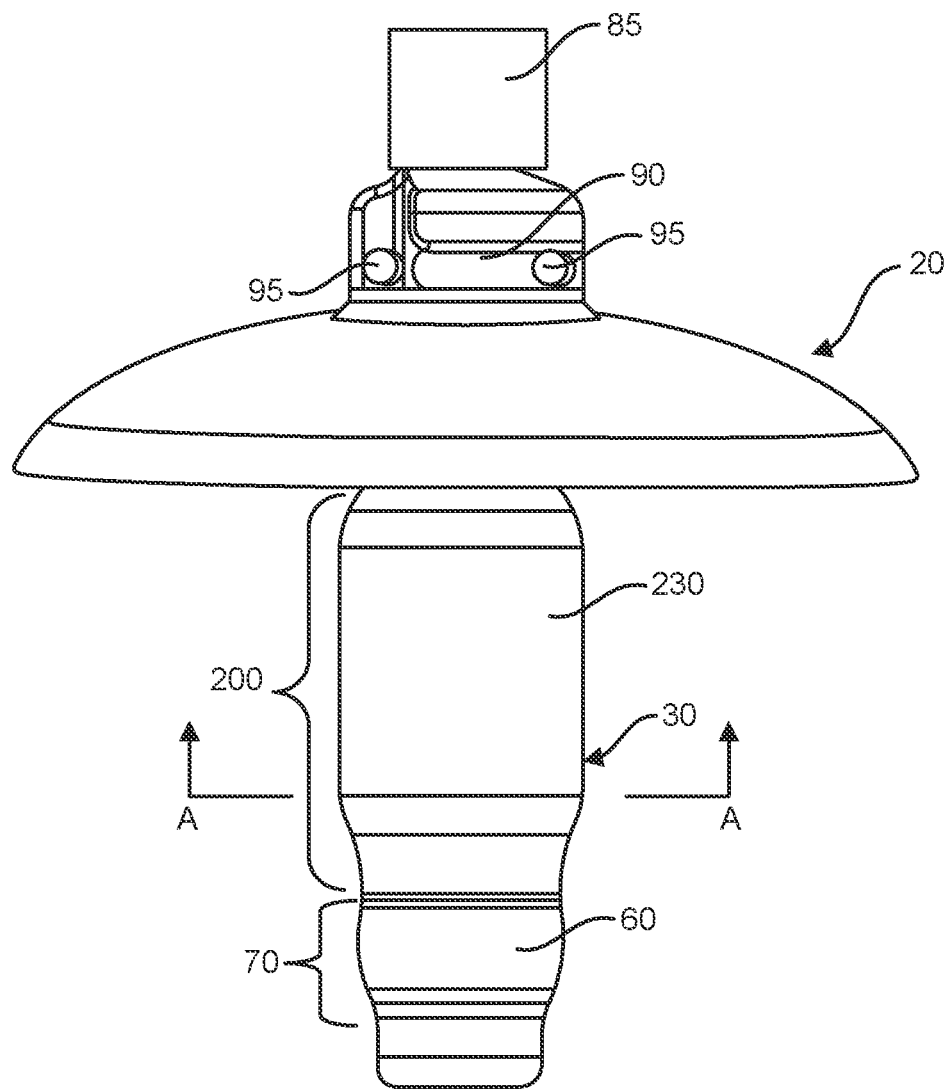
FIG. 6 is an alternative side view of the medical device in accordance with the embodiments of the invention.
Figure 7:
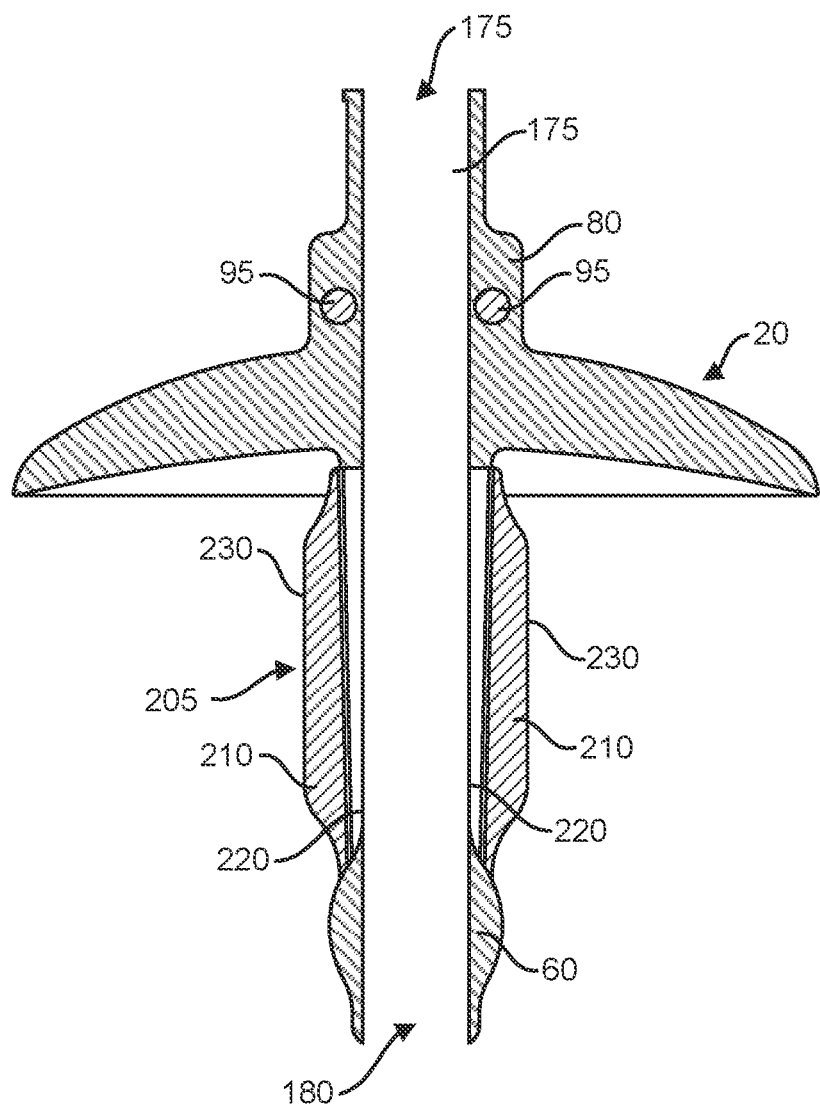
FIG. 7 is cross-sectional side view of the medical device in accordance with the embodiments of the invention.
Figure 8:
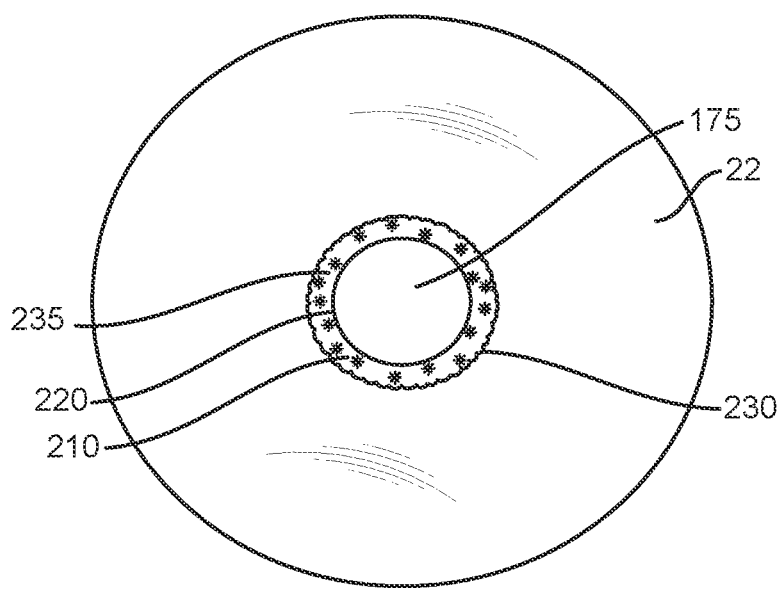
FIG. 8 is a cross-sectional bottom view of the medical device shown in FIG. 5.
Figure 9:
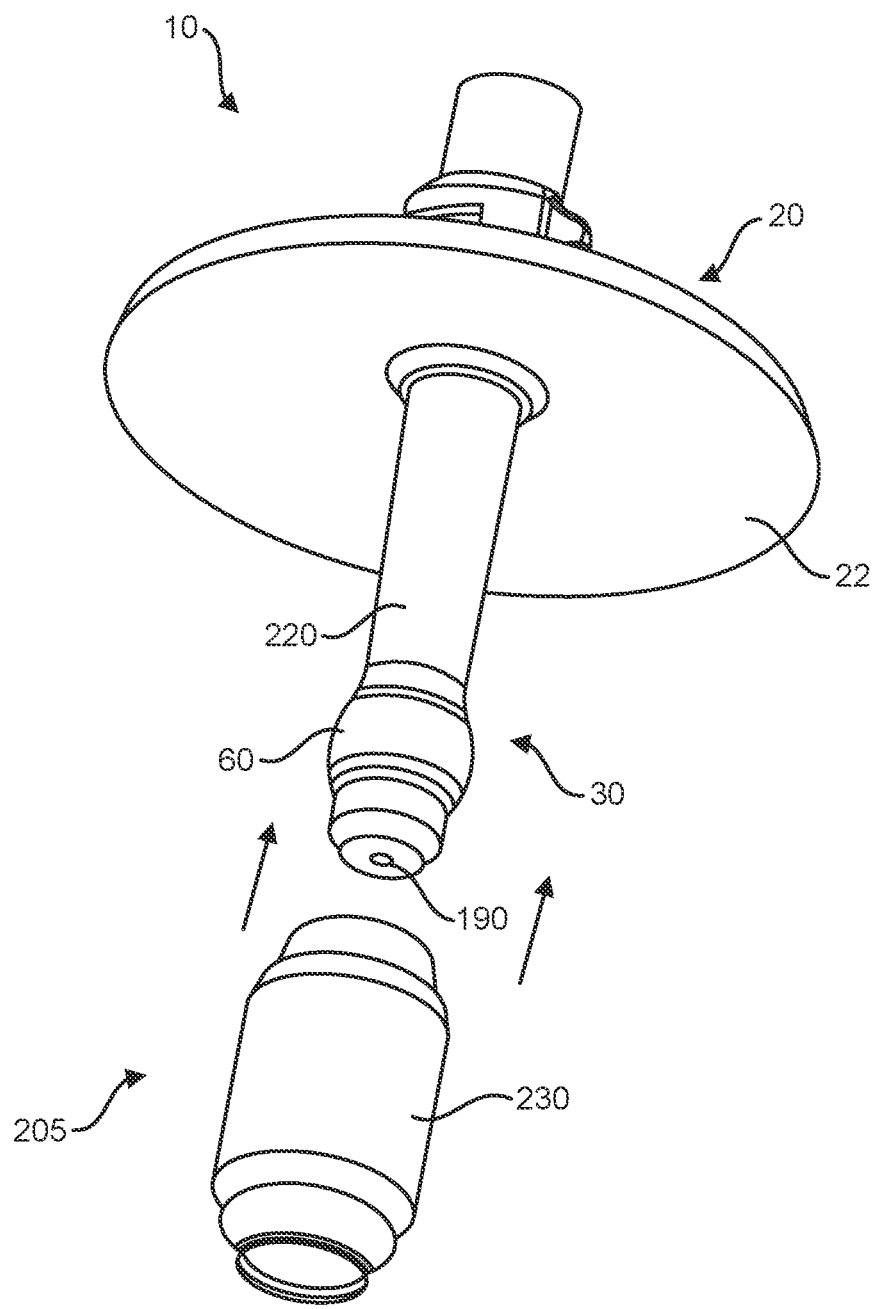
FIG. 9 is an exploded perspective view of the medical device in accordance with the embodiments of the invention showing the sleeve in a removable configuration.
Figure 10:
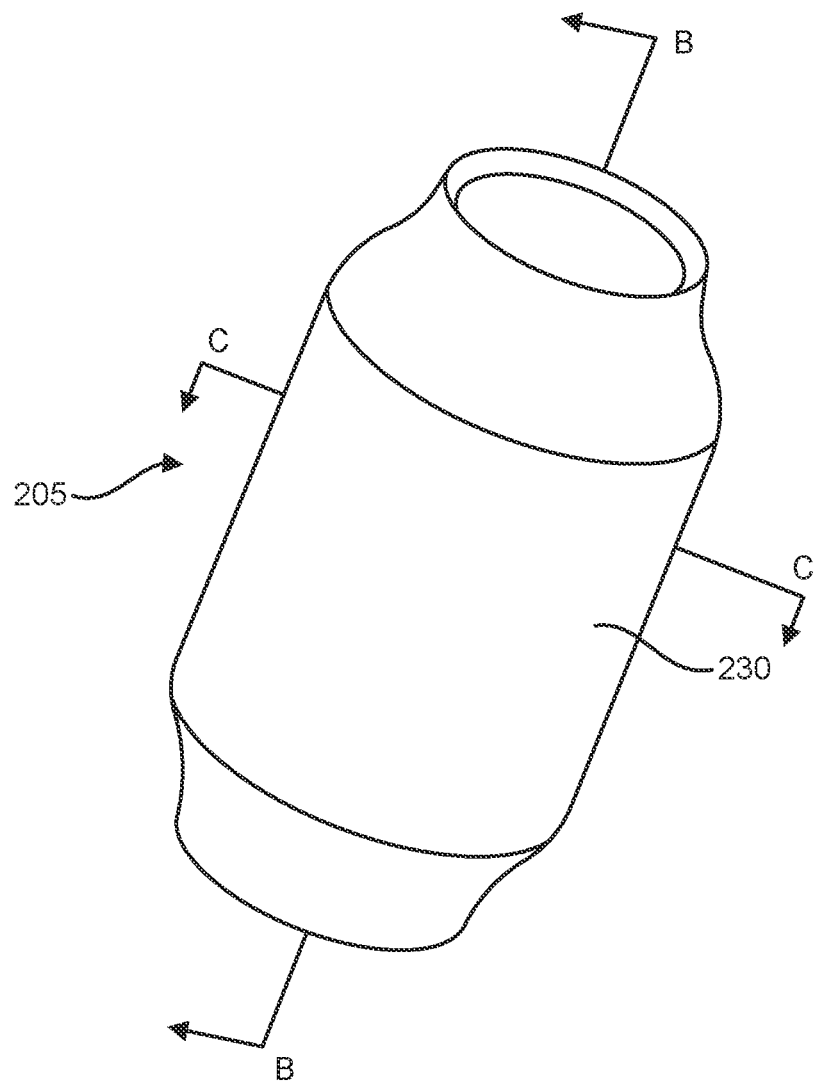
FIG. 10 is a perspective view of the sleeve.
Figure 11:
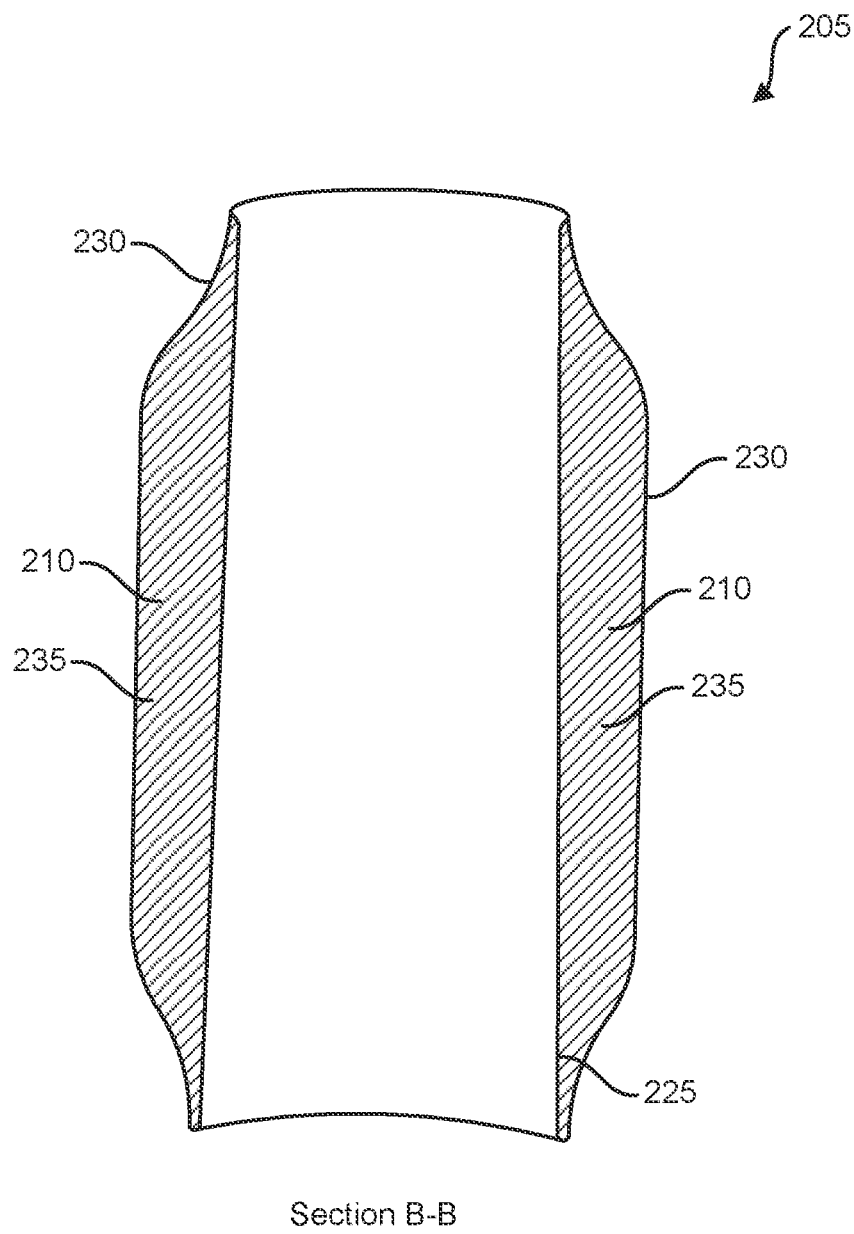
FIG. 11 is a cross-sectional side view of the sleeve shown in FIG. 10.
Figure 12:
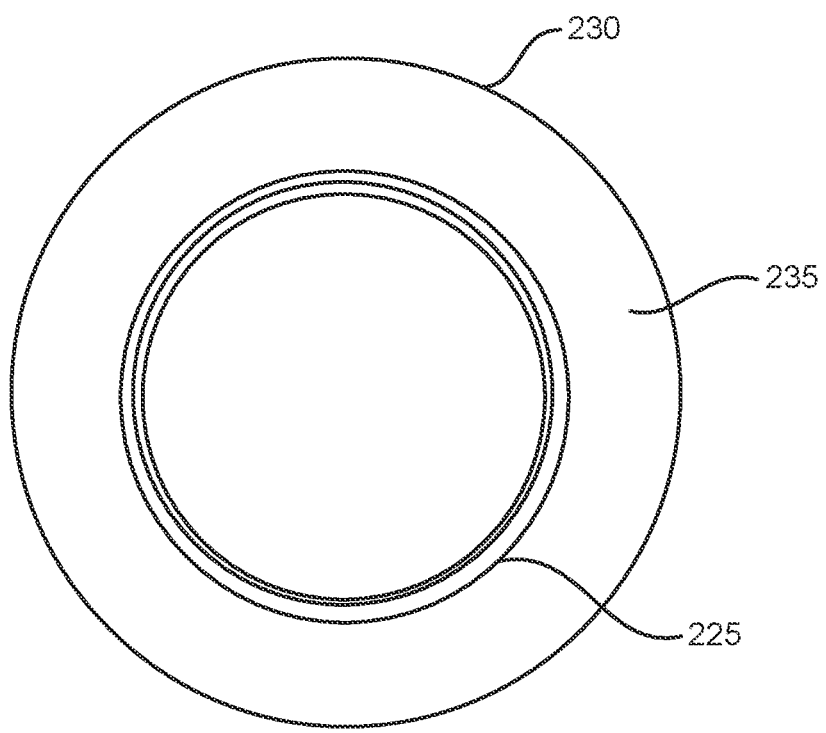
FIG. 12 is a cross-sectional bottom view of the sleeve shown in FIG. 10.

To facilitate removal of the medical device 10 after use, the insert member 80 may optionally have a string 140 (as shown in FIG. 15) attached thereto. The string 140 may be a medical-grade suture, though any suitable material may be utilized. To facilitate attachment of the string 140 to the insert member 80, the insert member 80 may have an annular cavity 90 located on the exterior of the insert member 80, as best seen in FIGS. 5-7. The insert member 80 has at least one external opening 95 that provides external access to the annular cavity 90. Preferably, as best seen in FIGS. 5-6, the insert member 80 has two external openings 95 on opposing sides of the insert member 80. To secure the string 140 to the insert member 80, an end of the string 140 may be inserted through the external opening 95 into the annular cavity 90 and around the insert member 80 until the inserted end of the string exits the external opening 95. The string 140 may then be tied to secure the string 140 to the insert member 80. As used herein, "tying" the string may include any suitable method of securing the inserted end of the string to a portion of the string after inserting the end through the annular cavity 90 so that the string 140 is secured to the insert member 80.

The string 140 may be of a sufficient length to extend through the vaginal cavity 130 and outside of the patient's body when the medical device 10 is inserted in the cervical canal 100. By pulling the string 140, the medical device 10 may be removed through the vaginal cavity 130 without forceps or a similar device. Alternatively, the string 140 may be permanently attached to the insert member 80. For instance, the device 10 may be molded such that one end of the string is molded into the insert member 80.

As shown in FIG. 7, the medical device 10 may have a bore 175 extending longitudinally through the arm 30 and through the shield 20 such that the bore 175 has an opening 180 at the distal end 50 of the arm 30 and an opening 185 on the side of the shield 20 opposite the arm 30. The bore 175 may extend through the insert member 80 such that the opening 185 on the side of the shield opposite the arm 30 is located at the end of the insert member 80. Thus, the bore 175 may extend completely through the device 10 in a generally straight line. When the device 10 is in place during use, as shown in FIG. 15, the bore 175 creates a passageway between the vaginal cavity 130 and the cervical canal 100 or uterine cavity 130 through the device 10. To use the device 10, a catheter 160 may be inserted into the opening 185 of the bore 175 on the side of the shield opposite the arm 30 and pushed through the bore 175 and then through the opening 180 at the distal end 50 of the arm 30. The bore 175 is of sufficient diameter to allow the catheter 160 to pass therethrough. Accordingly, the medical device 10 may function as a guide or cannula to facilitate passage for the catheter 160, which may be used as an insemination catheter for introducing a semen sample into a patient's reproductive system. In this manner, the medical device 10 may be utilized during intracervical or intrauterine insemination procedures for introducing a semen sample into the cervical canal 100 or the uterine cavity 110, as desired. The catheter 160 may then be removed while leaving the device 10 in place.

Figure 3:
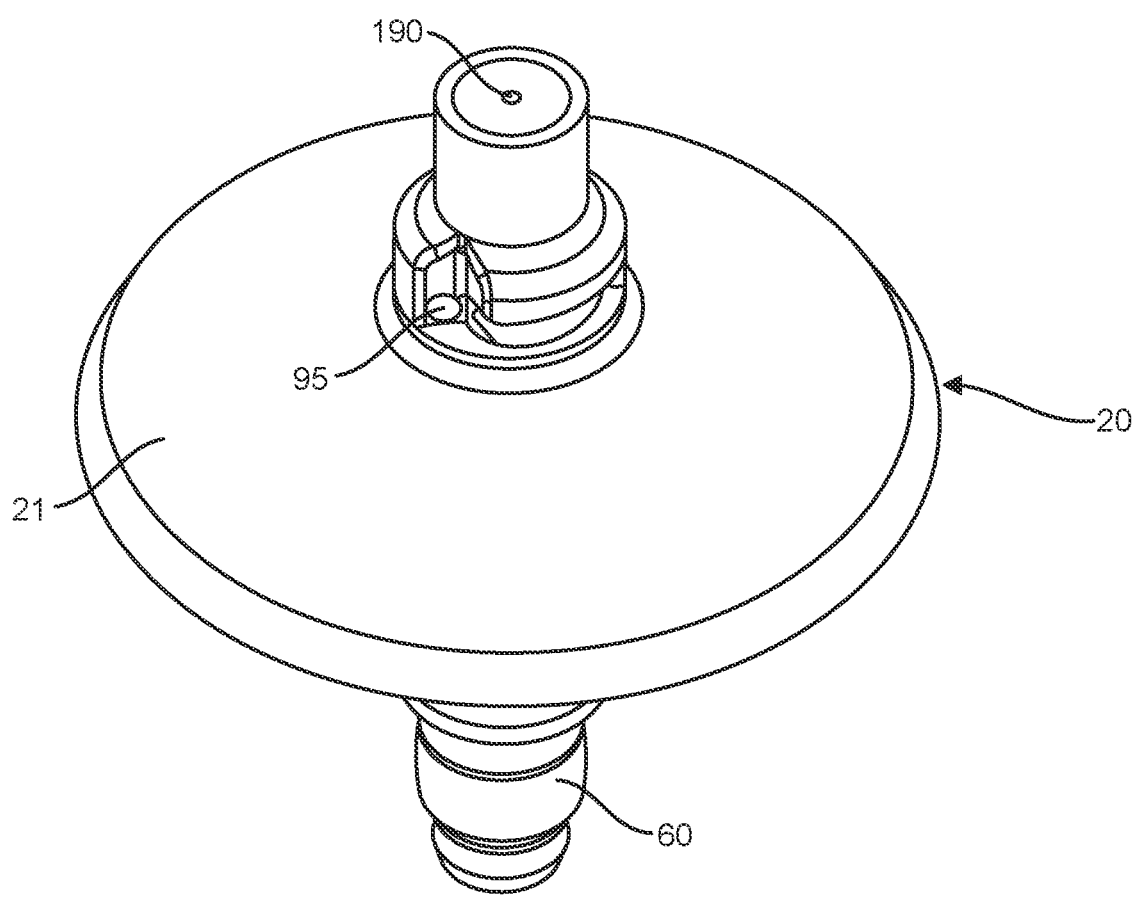
FIG. 3 is a top perspective view of the medical device in accordance with the embodiments of the invention.
Figure 4:
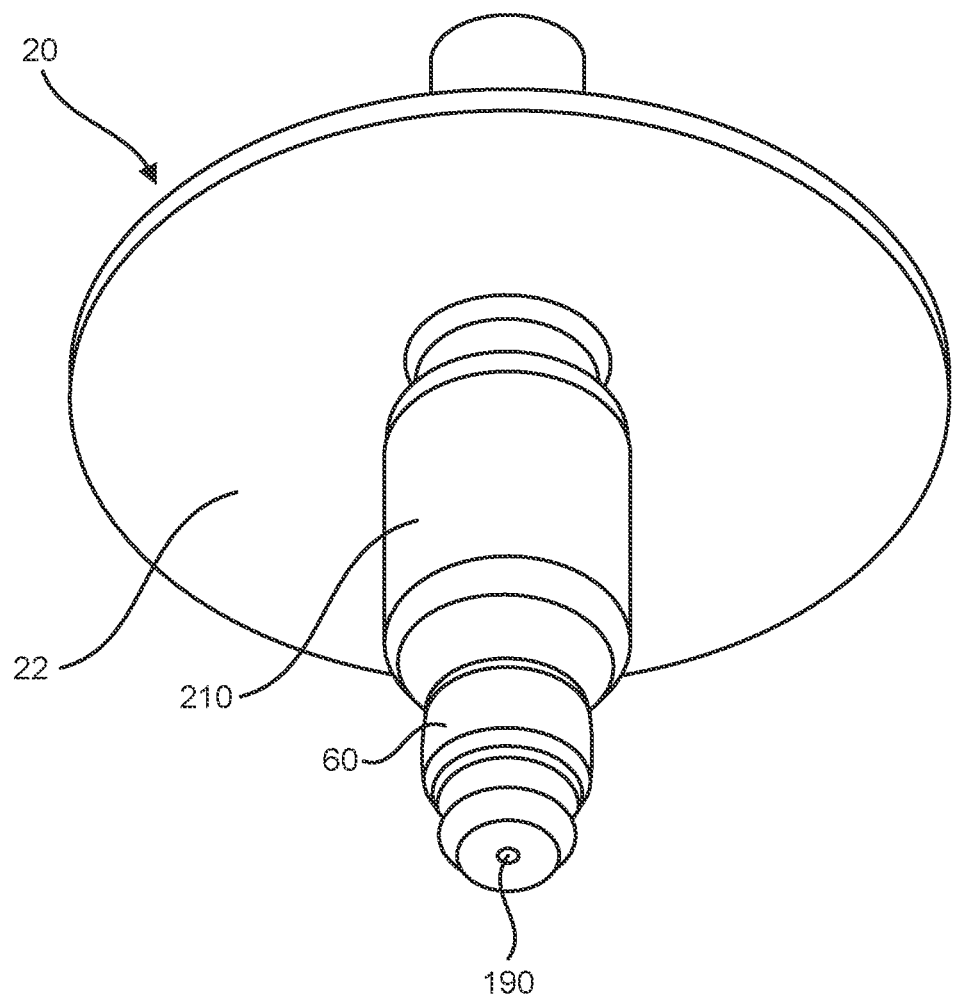
FIG. 4 is a bottom perspective view of the medical device in accordance with the embodiments of the invention.

The device 10 may further comprise a valve 190 disposed at the distal end 50 of the arm 30, as shown in FIG. 4. In an alternative embodiment, the valve 190 may be disposed at both the distal end 50 of the arm 30 and at the opening 185 on the side of the shield 20 opposite the arm 30, as shown in FIG. 3. The valve 190 is operable between an open position and a closed position and is configured such that it provides a fluid-tight seal around the catheter 160 or other object passing therethrough. In the preferred embodiment, as shown in FIGS. 1-5, the valves 190 are elastomeric circular valves with a small circular opening that is resiliently biased in a closed position, but flexible enough to expand when a foreign object (e.g. a catheter 160) is pushed through the circular opening. When in use and in the open position, the valve 190 creates a fluid-tight seal around the foreign object. Other configurations of valves operable to create a seal around an object passing through the bore 175 may be used, including but not limited to, for example, a plurality of elastomeric flaps that are resiliently biased inwardly toward the center of the bore 175 and against each other when the valve 190 is in the closed position and create a fluid-tight seal around the catheter 160 when in an open position. As used herein, the term "elastomeric" refers to any material that is flexible and/or stretchable such that the material can flex and/or stretch and then return to its original position.

During an artificial insemination procedure, an insemination catheter 160 may pass through the entirety of the device 10. When the catheter 160 is pushed through the openings 180, 185 at each end of the device 10, the catheter 160 forces the valves 190 outward and open. In this manner, a catheter 160 may pass through the medical device 10, deliver a semen sample to a patient's cervical canal 100 or uterine cavity 110, and then be removed from the medical device while leaving the device 10 in place. Upon delivery of the semen sample, the insemination catheter 160 may be entirely or partially removed from the medical device 10. When the catheter 160 is removed, the valve 190 reverts to its original, closed position. When the valve 190 is in the closed position, the semen sample is prevented from exiting the cervical canal 100 via the bore 175 and thus cannot leak back through the medical device 10 into the vaginal cavity 130. Thus, the medical device 10 may effectively function both as a cannula for an insemination instrument and as a cervical plug that prevents semen that has been introduced into the patient's cervical canal 100 or uterine cavity 110 from leaking into the patient's vaginal cavity 130.

For the purposes of promoting and understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical." Numerous modifications and adaptations will be readily apparent to those skilled in this art without departing from the spirit and scope of the present invention.

What is claimed is:

1. A medical device for preventing reflux in a cervix, said device comprising:
    a shield having a proximal surface and a distal surface, wherein the distal surface is operable to cover an external os of the cervix;
    an arm having an exterior surface, a proximal end and a distal end,
        wherein the proximal end of the arm is attached to the distal surface of the shield and the distal end of the arm is operable to be inserted into the cervix,
    a sleeve configured to extend along a length of the arm between the proximal end and the distal end, the sleeve comprising an injection port and a plurality of tubes embedded within the sleeve,
    a bore extending longitudinally through the arm and through the shield such that the bore has an opening at the distal end of the arm and an opening on a side of the shield opposite the arm, wherein the bore is operable to receive a catheter,
    wherein the sleeve is operable to conform to a lining of the cervix.

2. The medical device of claim 1 wherein the sleeve comprises an enclosed space operable to hold a fluid.

3. The medical device of claim 1 wherein the sleeve comprises a tube configured to wrap around the arm.

4. The medical device of claim 1 wherein the sleeve comprises a plurality of circumferential protrusions operable to engage the lining of the cervix.

5. The medical device of claim 1 comprising a first valve disposed at the distal end of the arm, wherein the first valve is operable between an open position and a closed position, such that when the first valve is in an open position a fluid-tight seal is created around the catheter, and when the first valve is in a closed position a fluid-tight seal is created at the opening at the distal end of the arm.

6. The medical device of claim 5 comprising a second valve disposed at the proximal end of the arm, wherein the second valve is operable between an open position and a closed position, such that when the second valve is in an open position a fluid-tight seal is created around the catheter, and when the second valve is in a closed position a fluid-tight seal is created at the opening at the side of the shield opposite the arm.

7. The medical device of claim 1 comprising a protrusion positioned along a length of the arm between a midway point of the arm and the distal end of the arm.

8. The medical device of claim 1 comprising an insert member secured to the shield, wherein the insert member is secured to an opposite side of the shield as the proximal end of the arm.

9. The medical device of claim 8, wherein the insert member has an annular cavity, and wherein the insert member has an external opening that provides external access to the annular cavity, wherein the annular cavity is operable to receive a retention string.

10. The medical device of claim 1, wherein the shield has a concave shape, wherein the proximal end of the arm is secured to a concave side of the shield.

11. The medical device of claim 1, wherein a fluid is added to the sleeve through the injection port.

12. The medical device of claim 1, wherein a fluid is removed from the sleeve through the injection port.

13. The medical device of claim 1, wherein the injection port is self-sealing.

14. The medical device of claim 1, wherein the sleeve is removable from the arm.

15. The medical device of claim 14, wherein the sleeve is configured to slidably engage with an exterior surface of the arm.

* * * * *